United States Patent [19]
Jenkins et al.

[11] Patent Number: 5,772,977
[45] Date of Patent: Jun. 30, 1998

[54] ANTHRAQUINONE PROCESS

[75] Inventors: Colie Lawrence Jenkins, Memphis, Tenn.; Fred Bronson Kirby; Theodore Augur Koch, both of Wilmington, Del.

[73] Assignee: E. I. du Pont de Nemours and Company, Wilmington, Del.

[21] Appl. No.: 549,586

[22] Filed: Oct. 27, 1995

Related U.S. Application Data

[63] Continuation-in-part of Ser. No. 355,783, Dec. 14, 1994, abandoned.

[51] Int. Cl.$^6$ .................................................. C01B 15/023
[52] U.S. Cl. .......................... 423/588; 423/628; 502/333
[58] Field of Search ...................... 423/588, 628

[56] References Cited

U.S. PATENT DOCUMENTS

| | | |
|---|---|---|
| 2,158,525 | 5/1939 | Reidl et al. . |
| 2,215,883 | 9/1940 | Reidl et al. . |
| 2,657,980 | 11/1953 | Sprauer . |
| 3,009,782 | 11/1961 | Porter . |
| 3,030,186 | 4/1962 | Kreuz et al. . |
| 3,615,207 | 10/1971 | Lee . |
| 3,635,841 | 1/1972 | Keith et al. . |
| 4,061,598 | 12/1977 | Makar ..................................... 423/588 |
| 4,390,456 | 6/1983 | Sanchez et al. ........................ 423/628 |
| 4,800,075 | 1/1989 | Jenkins ................................... 423/588 |
| 5,244,648 | 9/1993 | Dupin et al. ........................... 423/628 |
| 5,384,302 | 1/1995 | Gerdes et al. .......................... 423/628 |
| 5,531,976 | 7/1996 | Decker, Jr. et al. ..................... 423/628 |
| 5,593,654 | 1/1997 | Decker, Jr. et al. ..................... 423/628 |

FOREIGN PATENT DOCUMENTS

| | | |
|---|---|---|
| 600788 | 6/1960 | Canada . |
| 718305 | 11/1954 | United Kingdom . |
| 718306 | 11/1954 | United Kingdom . |
| 726250 | 3/1955 | United Kingdom . |
| 760737 | 11/1956 | United Kingdom . |

*Primary Examiner*—Wayne Langel

[57] ABSTRACT

An improved process for producing hydrogen peroxide by the anthraquinone process, utilizing a palladium on calcined support catalyst having high attrition resistance, is provided.

2 Claims, No Drawings

ANTHRAQUINONE PROCESS

CROSS REFERENCE TO RELATED APPLICATION

This application is a continuation-in-part of application Ser. No. 08/355,783, filed Dec. 14,1994, abandoned.

FIELD OF THE INVENTION

This invention relates to an improved process for the hydrogenation of anthraquinones in a cyclic process to produce hydrogen peroxide and more specifically to the use of a hydrogenation catalyst comprising palladium on a support.

BACKGROUND OF THE INVENTION

The "anthraquinone process" to produce hydrogen peroxide involves the reaction of 2-alkylanthraquinones, commonly referred to as "anthraquinones" or "quinones", dissolved in a suitable solvent or solvent mixture, with hydrogen in the presence of a catalyst to form the corresponding 2-alkylanthrahydroquinones, commonly referred to as "anthrahydroquinones" or "hydroquinones". These 2-alkylanthraquinones are generally a mixture of both the anthraquinone form and the corresponding 5,6,7,8-tetrahydroanthraquinone form. The alkyl side chain on the anthraquinone can be highly variable, but is usually an ethyl, butyl, or amyl group. The anthraquinone is commonly called the reaction carrier or working material and the anthraquinone-solvent mixture is called the working solution. After reduction, the catalyst is removed and the hydroquinones are oxidized to the original anthraquinones with an oxygen containing gas (usually air) with simultaneous formation of hydrogen peroxide. The hydrogen peroxide is extracted with water and the aqueous solution is purified and concentrated to the desired concentration. The anthraquinone working solution is returned to the hydrogenation reactor to complete the cycle.

U.S. Pat. No. 2,657,980, issued Nov. 5, 1949, discloses the use of a palladium on alumina catalyst in a process to produce hydrogen peroxide. The catalyst support materials are described as activated alumina, at least 50% by weight of which is any natural or synthetic hydrated alumina, dehydrated or partially dehydrated, whereby a microporous alumina is obtained containing alpha alumina monohydrate, gamma alumina or both. The catalyst contains metallic palladium, 0.01 to 10% by weight.

British Patents 718,305 and 718,306, both issuing on Nov. 10, 1954, disclose the use of a palladium hydrogenation catalyst for the production of anthrahydroquinones or anthraquinols and a process to prepare such catalysts, respectively. The catalyst consists of metallic palladium, 0.1–10 wt %, formed by reduction of one or more palladium oxides or basic carbonates preferably deposited on a carrier of alumina, charcoal, magnesia or other suitable support and has a particle size corresponding to a screen aperture between 0.1 inch and 0.001 inch.

British Patent 760,737, issued on Nov. 7, 1956, describes a catalyst for use in the hydrogenation stage of the anthraquinone process prepared by impregnating a silica/alumina carrier with a palladium compound by adsorption from an aqueous solution of a palladium salt, treating the catalyst with an aqueous alkaline solution, followed by reduction. The catalyst, typically 2.3% palladium on 60–150 micron silica/alumina, showed initial productivities of 2.5–4.6 g $H_2O_2$/g catalyst/hr. However, the catalyst was deactivated readily, requiring a more than 10-fold increase in catalyst loading over a 595 hour continuous operation to maintain productivity. This patent also teaches that palladium on silica/alumina catalysts are more active than palladium on alumina catalysts.

Canadian Patent 600,788, issued Jun. 28, 1960, describes a process to prepare catalysts which involves depositing a group VIII metal on an open-surfaced oxide carrier and catalysts prepared by this process. The carrier is an oxide of silicon, aluminum, or a mixture of these, prepared pyrogenically at temperatures between 900 and 1200° C. to form aerogels. These materials and their preparation are described in British Patent 726,250 issued Mar. 16, 1955. Open surface structure, also called porosity factor, f, is defined as having a ratio of the BET surface area to the surface area determined by electron microscopy, of 3–25. These carriers are of a particle size smaller than 2 mesh, and surface area of 10–600 $m^2$/g. The surface possesses only a very minor portion of pores.

U.S. Pat. No. 3,030,186, issued Apr. 17, 1962, describes a supported noble metal catalyst (Pd, Pt, Rh, Ru) having a particle size in the range of 4–60 mesh, microporosity (defined as the volume of pores less than 800 Å in diameter) less than 0.03 cc/g, and a BET surface area in general less than 5 $m^2$/g. The amount of metal is in the range of 0.1 to 2% by weight. This patent teaches that gamma alumina is an inferior support for use with palladium in the hydrogenation stage of the anthraquinone process due to poor selectivity of this support resulting in formation of undesirable byproducts which are incapable of producing hydrogen peroxide upon oxidation.

U.S. Pat. No. 3,615,207, issued Oct. 26, 1971, describes a hydrogenation catalyst with 0.05–5% by weight of metallic palladium dispersed uniformly over the surface of alumina spheres which are described in U.S. Pat. No. 3,635,841, issued Jan. 18, 1972. The alumina spheres are from about 0.07–0.5 mm in diameter for fluid bed hydrogenations and 0.15–6.5 mm in diameter for fixed bed hydrogenations. The alumina support is predominantly in the delta and theta crystalline phases, being substantially free from alpha- and gamma-alumina, and has pore size of 350–600 microns and BET surface area of 20–200 $m^2$/g. These patents teach that a catalyst on an alpha- or gamma-alumina support is not attrition resistant and has a short active life.

While it is known that palladium catalysts on a support are used commercially for the hydrogenation of anthraquinones in the process to produce hydrogen peroxide, there are problems that have been associated with such catalysts. These problems include the following: (1) low catalyst activity which has necessitated high loading of the catalyst in order to achieve high production rates; (2) high loadings of catalyst contribute to increased attrition of catalyst particles and can cause filtration problems and/or downstream contamination resulting in product yield loss; (3) short catalyst life which requires high catalyst turnover or regeneration to maintain a sufficient loading of active catalyst to achieve desired production rates; (4) catalyst loss during regeneration and catalyst loss due to filter leakage requiring significant addition of fresh catalyst to the hydrogenation reaction vessel; (5) high catalyst inventory requirements due to low activity, short catalyst life, high turnover, catalyst losses, and the need to add fresh catalyst.

Conventional supports used to prepare catalysts for the hydrogenation of anthraquinones have high surface areas and small deep pore structures. Due to the size of these pore structures, impregnation of these supports with metals such as palladium deposits much of the metal in regions of the support which are largely inaccessible to the anthraquinone moiety. Consequently, these supports show almost no improvement in hydrogenation activity with increasing metal concentration. The restrictive pore structure of conventional supports also promotes over-hydrogenation of the anthraquinones thereby forming byproducts which do not produce hydrogen peroxide during the oxidation step of the process. These byproducts can build up in the working solution and lower the productive capacity of an operative system. Removal of these components is difficult and requires additional processing as described in U.S. Pat. Nos. 4,668,436, issued May 26, 1987 and 4,544,543, issued Oct. 1, 1985.

The hydrogen peroxide production process of the present invention eliminates these problems and provides superior catalyst performance based on activity, catalyst life, and filtering ability, with very high selectivity relative to catalysts known in the art. Surprisingly it has been found that catalysts prepared on supports with an average pore size of 50–1000 Å, an average particle size of 1–200 microns and a surface area of 20–200 m$^2$/g show a dramatic performance improvement relative to catalysts known in the art for the hydrogenation of 2-alkylanthraquinones. Catalysts for this application must also be quite attrition resistant to enable use of normal filtration procedures and to avoid excessive catalyst losses. Some supports, with larger to very much larger pores, although exhibiting excellent activity are not suitable for the slurry hydrogenation stage of the anthraquinone process due to poor attrition resistance.

SUMMARY OF THE INVENTION

The process of this invention for the production of hydrogen peroxide is an improved anthraquinone process, the improvement comprising in the hydrogenation stage of said process the use of a palladium catalyst which consists essentially of 0.2–10% by weight of metallic palladium on a support having pore diameter of from 50–1000 Å, volume average particle size of from 1–200 microns, BET surface area of 20–200 m$^2$/g and an attrition resistance greater than 90%.

DETAILED DESCRIPTION OF THE INVENTION

The present invention provides an improvement in the hydrogenation stage of the anthraquinone process to produce hydrogen peroxide which involves using a palladium catalyst on a support for the hydrogenation of anthraquinones to hydroquinones. Details of the anthraquinone process of the prior art are described in U.S. Pat. Nos. 2,158,525, issued May 16, 1939, 2,215,883, issued Sep. 24, 1940, and 3,009,782, issued Nov. 21, 1961, incorporated herein by reference.

This invention relates to use of a hydrogenation catalyst which is palladium on a calcined oxide or calcined mixed oxide support having an average pore diameter of 50–1000 Å, a volume average particle size range of 1–200 microns, and a BET surface area of 20–200 m$^2$/g The catalyst support is a calcined oxide or calcined mixed oxide and can be alumina, silica, titania, silica/alumina, and silica/alumina/magnesia and the like. Preferably the support is a high purity gamma alumina, having greater than 90% of the alumina in the gamma crystalline phase. This high purity gamma alumina can be conveniently prepared by starting with a pure boehmite alumina phase produced from the hydrolysis of aluminum alkoxides which can be then dried at 100°–125° C., preferably in a vacuum oven. Calcination can be performed at 450°–800° C., for 2–4 hours.

The catalyst support has an average pore diameter of from about 50 to about 1000 Å, preferably about 60–150 Å. Increasing pore diameter, in a way that the surface area does not decrease, increases catalyst activity and decreases the rate of activity loss, but also makes the catalyst increasingly prone to attrition.

The support has a range of particle size from about 1 to 200 microns, preferably with a volume average particle size of from about 20–80 microns. Smaller particles can improve activity of the catalyst; however, it is desirable that the particles remain large enough for use with conventional filters. The BET surface area of the supports used in this invention is within the range of 20–200 m$^2$/g, preferably 120–170 m$^2$/g.

The catalysts used in this invention contain from about 0.2 to 10% by weight of metallic palladium, preferably from about 0.5 to 4% by weight, deposited on the supports described above with a dispersion of 20–40%. Dispersion is defined as the percentage of palladium exposed and available for reaction relative to the total palladium content of the catalyst.

In addition to having the aforementioned characteristics of pore diameter, particle size and surface area, the supports of this invention must also possess sufficient physical strength so as to render them resistant to attrition. Attrition generates small particles by wearing down the edges of larger particles or fracturing due to compressive stress and can cause serious problems such as plugging of the filters or catalyst loss due to smaller particles passing through the filters.

Attrition resistance is defined as 100 minus the % change in number average particle size. An attrition test can be used to determine attrition resistance of the supports which involves agitation of an aqueous slurry of the support. Particle size analysis is performed before and after the test to determine changes in particle size distribution. The change either in number average particle size or volume average particle size can be used to measure attrition resistance. Number average particle size is more meaningful because it provides a more sensitive evaluation of attrition resistance as the increase in number of small particles affects the number average particle size more significantly than the increase in volume of small particles will affect the volume average particle size. To illustrate, a support of the prior art with a volume average particle size of 101.9 microns and a number average particle size of 45.0 microns was tested for attrition resistance. After the test, this support had a volume average particle size of 98.0 microns and a number average particle size of 15.2 microns. This means that there was a substantial number of small particles generated indicating poor attrition resistance. Using the same test method, a support of this invention with a volume average particle size of 44.3 microns and a number average particle size of 24.5 microns was tested for attrition resistance. After the test, this support had a volume average particle size of 44.2 microns and a number average particle size of 24.3 microns showing substantially no change in particle size or shape and no generation of small particles. The supports used in this invention can have a change in number average particle size of less than 10% yielding an attrition resistance value of greater than 90%, preferably 5% and 95%, respectively.

Attrition resistance is an important element of the catalyst supports used in the process of the present invention. A test for attrition resistance must be of sufficient duration (time) and generate sufficient collisions between particles (by agitation or other means) to provide reliable data to help select the catalyst support. A test carried out for insufficient duration or collisions can falsely indicate that a catalyst support is attrition resistant. Such catalysts supports will not withstand actual process conditions. The attrition test used to determine attrition resistance in the present invention utilizes agitation of the catalyst support in an aqueous slurry at an agitation rate of 50 feet per second for 1 hour.

The catalysts used in this invention can be prepared using conventional techniques such as the incipient wetness technique or other techniques involving deposition of palladium salts from aqueous media onto supports followed by washing, drying and subsequent reduction of the palladium ion to the metallic state. Alternatively, organometallic palladium compounds and complexes can be used to deposit palladium on the supports in organic media. After removal of the organic solvent, for example, by evaporation, the residue can be treated with heated nitrogen and then reduced with a hydrogen containing gas at elevated temperatures.

The catalysts of this invention are superior relative to catalysts of the prior art in the hydrogenation stage of the anthraquinone process for production of hydrogen peroxide in that more $H_2O_2$ per catalyst per time, and more $H_2O_2$ per palladium per time can be produced. These catalysts also possess superior catalyst life and have excellent attrition resistance, requiring much less make-up catalyst to be added to the process to maintain production rates, and can be easily managed with conventional filters. These features allow the catalyst to achieve high selectivity by minimizing overhydrogenation thereby reducing quinone consumption and also slowing the rate of catalyst deactivation during extended use.

Yet another advantage of using the supports described in the present invention over microporous supports of the prior art in hydrogenations is that palladium metal is readily accessible for reaction on the supports described herein. Increasing palladium loading on a microporous support gives little to no improvement in the rate of reaction.

Often catalysts possessing very high activity exhibit poor selectivity when compared to their less active counterparts. However, the catalysts of the present invention show excellent selectivity in the hydrogenation of 2-alkylanthraquinones in the process to produce hydrogen peroxide.

Supports made from alumina, silica, titania, or mixtures such as silica/alumina, or silica/alumina/magnesia which have structures with the combination of characteristics described herein work equally well. For a general description of alumina including information on calcination conditions, pore structure, crystalline forms see Kirk-Othmer "Encyclopedia of Chemical Technology", third edition, volume 2, John Wiley & Sons, pp. 218–244 and "Catalyst Supports and Supported Catalysts", by Alvin B. Stiles, Butterworth Publishers, 1987, pp. 11–55.

The process of the present invention using the catalysts of this invention in the hydrogenation stage of the anthraquinone process to produce hydrogen peroxide can operate within conventional ranges of temperature and pressure. In this invention, the working solution is an anthraquinone in a solvent or solvent mixture. The hydrogenation of the anthraquinone working solution can be performed at pressures between atmospheric to 60 psia, preferably between atmospheric and 40 psia and at temperatures between ambient or about 20° C. to about 150° C., preferably, the temperature is between 35° C. and 65° C. The catalysts are suitable for use in free suspension in a hydrogenator and are of such a particle size that separation from the anthraquinone working solution can be achieved simply by filtration. The hydrogenation can be performed as a batch or continuous operation.

The hydrogenated anthraquinone working solution can then be oxidized with air or an oxygen containing gas and subsequently extracted or stripped to remove the formed hydrogen peroxide as described in the above referenced U.S. Pat. Nos. 2,158,525, 2,215,883, and 3,009,782. The extracted working solution is then recycled to the hydrogenation step.

In the process of this invention, it is the combination of features of the catalysts working synergistically that increase activity and selectivity in the hydrogenation stage of the anthraquinone process to produce hydrogen peroxide. Consequently, quinone consumption is reduced and the rate of catalyst deactivation is slowed, which is particularly in evidence during extended use. The catalysts described herein have been used in continuous operation for months without loss of productivity.

EXAMPLE 1

In a 1.75-liter continuously stirred tank-type reactor with internal filters to retain the catalyst inside the reactor, operating at a volume of 1.25 liters, a temperature of 43°–45° C. and pressure of 15 psig, a working solution was circulated at a flow rate of 50 ml/min. The working solution initially contained 18 wt % ethylanthraquinone, of which 45 wt % was tetrahydroethylanthraquinone, 58 wt % of an aromatic solvent (alkylated benzenes - heavy naphtha fraction, Aromatic 150), and 24 wt % tetra-n-butylurea. The hydrogen feed rate was controlled to give a maximum reduction level (anthrahydroquinone or HQ titer) of 0.408 g mol/l. 2.254 g of a 2.6 wt % palladium on gamma alumina catalyst was added to the reactor.

The catalyst had average pore size of 114 Å, average particle size of 44 microns, surface area of 158 m$^2$/g. Pore size was determined by nitrogen sorption using the BJH method described in Barret, et al., J. Am. Chem. Soc., 1951, vol. 73, p. 373. Particle size was determined on unsonicated samples using a Microtrac Particle Analyzer, available from Leeds & Northrup. Surface area was determined by the BET method described by Brunauer, et al., in J. Am. Chem. Soc., 1938, vol. 60, p. 309.

An attrition test was performed by preparing an aqueous suspension of the support material at a solids concentration of 30 g/l. This slurry was placed in a 2.5 gallon baffled vessel using a 3.75 inch pitched turbine blade agitator. The slurry was agitated at a tip speed of 50 ft/sec for 60 minutes. For the attrition test, particle size analysis was performed using a Coulter Counter Multisizer II. The number average particle size was 9.45 microns initially and 9.46 microns after the test, showing an attrition resistance of 100%.

The activity of the catalyst was monitored over time by following the loss of reduction level of anthraquinones to hydroanthraquinones by determining the concentration of anthrahydroquinones in the working solution by oxidation of this solution to hydrogen peroxide and titration of the hydrogen peroxide with a standard permanganate method as described by Vogel in "Quantitative Inorganic Analysis", third edition, Longmans, Green and Co., London, 1961, p. 295. After 44.8 hours, the reduction level had dropped to 0.304 g mol/l. Catalyst additions were subsequently made at time intervals to reach and maintain a stable reduction level of 0.360 g mol/l. Time, catalyst amounts, HQ titer and productivity are shown in Table 1.

TABLE 1

| Time (hr) | Catalyst (cumulative total, g) | HQ titer (g mol/l) | Productivity (g H$_2$O$_2$/g catalyst/hr) |
|---|---|---|---|
| 0 | 2.254 | 0.380 | 17.2 |
| 44.8 | | 0.304 | 13.8 |
| 45.6 | 2.857 | 0.318 | 11.4 |
| 68.9 | | 0.318 | 11.4 |
| 69.5 | 3.873 | 0.352 | 9.3 |
| 163.4 | | 0.346 | 9.1 |
| 164.0 | 4.414 | 0.394 | 9.1 |
| 211.5 | | 0.372 | 8.6 |
| 348.7 | | 0.360 | 8.3 |
| 635.5 | 4.414 | 0.359 | 8.3 |

In comparison, the process as described above was repeated using a 0.6 weight % palladium on alumina catalyst. This catalyst had an average pore size (diameter) of 28 Å, an average particle size of about 80 microns, a surface area of 213 m$^2$/g and attrition resistance of 73%. Such a catalyst system is outside the scope of this invention.

The initial catalyst addition was 10.055 g, which resulted in an initial reduction level of 0.256 g mol/l. The activity of the catalyst was monitored as described above. After 23.63 hours, the reduction level had fallen to 0.21 g mol/l. Catalyst additions were made with the goal of reaching and maintaining a stable reduction level of 0.360 g mol/l. Time, catalyst amounts, HQ titer and productivity are shown in Table 2.

TABLE 2

| Time (hr) | Catalyst (cumulative total, g) | HQ titer (g mol/l) | Productivity (g H$_2$O$_2$/g catalyst/hr) |
|---|---|---|---|
| 0 | 10.055 | 0.256 | 2.6 |
| 23.6 | | 0.201 | 2.0 |
| 24.1 | 16.009 | 0.285 | 1.8 |
| 47.2 | | 0.265 | 1.7 |
| 48.1 | 22.014 | 0.3165 | 1.5 |
| 71.0 | | 0.301 | 1.4 |
| 71.8 | 26.032 | 0.3505 | 1.4 |
| 94.9 | | 0.337 | 1.3 |
| 95.5 | 28.036 | 0.360 | 1.3 |
| 119.0 | | 0.3385 | 1.2 |
| 119.5 | 30.537 | 0.359 | 1.2 |
| 129.0 | | 0.3345 | 1.1 |
| 129.5 | 33.05 | 0.360 | 1.1 |
| 199.7 | | 0.3265 | 1.0 |
| 200.3 | 36.10 | 0.372 | 1.1 |
| 289.3 | | 0.350 | 1.0 |

The comparison of the data in Tables 1 and 2 shows that the catalyst system of this invention affords surprisingly large improvements over the catalysts of the prior art.

EXAMPLE 2

A glass jacketed hydrogenation vessel with internal baffles equipped with a highly efficient gas dispersing turbine (similar in design to a stirred tank reactor described in Ind. Eng. Chem. Res., 27,278 (1988) but with a reduced volume suitable for hydrogenation of a 100 ml volume of working solution) was purged with nitrogen. To the vessel was added 100 ml of working solution of a mixture of 2-ethyl, 2-butyl, 2-amyl anthraquinone, 24% by weight of the working solution, having about 55% of the quinones present in the form of tetraalkylanthraquinones, and a mixed solvent system containing an aromatic solvent of alkylated benzene, "Aromatic 150", 54% by weight of the working solution, and a polar solvent, diisobutylcarbinol, 22% by weight of the working solution, followed by 120 mg of 2.6 wt % palladium on gamma alumina catalyst, as described in Example 1.

The temperature of the vessel was brought to 35° C. and maintained at this temperature by recirculated water while stirring the mixture at a rate of 300 rpm over a period of 5–7 minutes then, momentarily, at 2500 rpm then stopped.

Hydrogen was admitted to the vessel at a rate of 100 cc per minute and allowed to stand under hydrogen purge for 5 minutes. The contents were agitated at 2500 rpm for 8 minutes. Inlet flow of hydrogen during this time was adjusted as needed to maintain a modest vent gas rate so as to prevent any backflow of air into the system. After this time, the gas flow was changed from hydrogen to nitrogen and was allowed to flow for 5 minutes.

The hydroquinone so produced was converted to H$_2$O$_2$ by oxidation. To analyze for hydrogenation catalyst efficiency, the reaction mixture was filtered through a 0.2 micron pore size medium. A 5-ml portion of the 100 ml of the reduced working solution filtrate was transferred to a 300-ml Morton flask with a drain containing 200 ml of deionized water and 5 ml of o-xylene. This mixture was stirred and sparged with oxygen for 10 minutes. The oxygen was turned off and stirring was stopped. The mixture was allowed to settle for 5 minutes and the aqueous portion (which now contained hydrogen peroxide) was transferred into a beaker. A second 200-ml quantity of deionized water was added to the remaining o-xylene solution in the flask. The mixture in the flask was again stirred and sparged with oxygen for 5 minutes. After 5 minutes to allow for settling, the water was again drawn off into the same beaker.

This 400-ml aqueous peroxide solution was stirred; to a 100-ml aliquot of this solution was added 25 ml of 3 N H$_2$SO$_4$ and 2 drops of ferroin indicator and was titrated with a 0.10 N Ce (IV) solution to an endpoint indicated by a color change from red-orange to clear-blue. The volume of Ce (IV) solution utilized was 3.1 ml (0.0031 eq) corresponding to 0.000155 mole or 0.00527 g of H$_2$O$_2$ in the 100-ml aliquot or 0.0211 g H$_2$O$_2$ (0.00062 mole) in the 5 ml of oxidized working solution. This, in, turn, corresponds to 0.124 mole of H$_2$O$_2$ per liter of working solution produced, requiring. 0.124 mole H$_2$. Multiplying by 22,400 ml H$_2$ per mole H$_2$ and dividing by reaction time (8 minutes) and catalyst amount (1.2 g per liter of working solution), the activity of the palladium hydrogenation catalyst was calculated to be 289 ml H$_2$ per liter of working solution per minute per gram catalyst.

EXAMPLE 3

A series of palladium on gamma alumina catalysts with increasing palladium loadings was examined following the procedure of Example 2. The alumina support used in these examples had average pore diameter of 113 Å, average particle size of 57 microns, surface area of 162 m$^2$/g and attrition resistance of 96%. For each catalyst, the process of Example 2 was repeated using 120 mg of catalyst. The activities of the catalysts were determined in the same manner as described above. Palladium loading and catalyst activity are shown in Table 3.

TABLE 3

| Palladium Loading (wt %) | Catalyst Activity (ml $H_2$/min/ l working solution/g catalyst) |
|---|---|
| 0.5 | 115 |
| 1.0 | 164 |
| 2.0 | 252 |
| 2.5 | 286 |

In comparison, a series of palladium on alumina catalysts outside of the scope of this invention, wherein the alumina support had a microporous structure was examined. The alumina support used in these tests had an average pore diameter of 35 Å, average particle size of about 80 microns, surface area of 330 m$^2$/g and an attrition resistance of 34%. Catalyst samples containing 0.08 wt %, 0.20 wt %, 0.40 wt %, 0.80 wt % and 2.4 wt % palladium were prepared. For each such catalyst the process of Example 2 was repeated using 500 mg of catalyst. The activities of the catalysts were determined in the same manner as described above. The activities of these catalysts were identical to each other, 22 ml $H_2$/min/l working solution/g catalyst. In addition to the very low catalyst activity, these catalysts do not meet the attrition resistance requirement for long term use and, unlike the catalysts of this invention, these catalysts show no benefits in activity by increased palladium loading.

We claim:

1. An improved anthraquinone slurry process for the production of hydrogen peroxide, the improvement comprising utilizing in the hydrogenation stage of said process a catalyst of palladium on a support consisting essentially of
   (A) 0.2–10% by weight of metallic palladium and
   (B) a calcined gamma alumina support having greater than 90% of the alumina in the gamma crystalline phase, said support having pore diameter of 50–1000 Å, volume average particle size of 1–200 microns, BET surface area of 20–200 m$^2$/g and an attrition resistance of greater than 90%.

2. The process of claim 1 wherein the support has a pore diameter of 60–150 Å, a volume average particle size of 20–80 microns and a BET surface area of 120–170 m$^2$/g.

* * * * *